United States Patent

[11] 3,614,066

| [72] | Inventor | Vearl Day<br>1335 S. W. Huntington Ave., Portland,<br>Oreg. 97225 |
|---|---|---|
| [21] | Appl. No. | 823,342 |
| [22] | Filed | May 9, 1969 |
| [45] | Patented | Oct. 19, 1971 |

[54] VARIABLE TENSIONING CABLE DRIVE FOR YARDERS AND THE LIKE
1 Claim, 8 Drawing Figs.

[52] U.S. Cl. ................................................ 254/185, 212/84, 212/89
[51] Int. Cl. ................................................ B66d 1/26, B66d 1/44, B66d 1/48
[50] Field of Search ........................................ 254/185, 185 RB; 212/84, 89

[56] References Cited
UNITED STATES PATENTS

| 1,358,128 | 11/1920 | Watson | 254/185 |
| 3,268,210 | 8/1966 | Wilson | 254/185 RB |
| 3,346,237 | 10/1967 | Erickson et al. | 254/185 RB |
| 3,376,981 | 4/1968 | Morrow | 254/185 |
| 3,378,232 | 4/1968 | McIntyre et al. | 254/185 RB |
| 3,386,704 | 6/1968 | Dawson | 254/185 RB |
| 3,436,056 | 4/1969 | Thompson | 254/185 |
| 3,502,302 | 3/1970 | Hamersley | 254/185 |

Primary Examiner—Harvey C. Hornsby
Assistant Examiner—Merle F. Maffei
Attorney—Oliver D. Olson ABSTRACT: Main and haulback cable drum gears are coupled to a power-driven shaft through a coupling gear mounted on the shaft for independent rotation and connected to the shaft through the relatively rotatable housing and output shaft of a hydraulic motor. The drum gears are connected releasably to the associated drums by independently operable clutches.

VEARL DAY
INVENTOR.

VEARL DAY
INVENTOR.

BY *Orvin Q. Olson*

AGENT

VARIABLE TENSIONING CABLE DRIVE FOR YARDERS AND THE LIKE

BACKGROUND OF THE INVENTION

This invention relates to cable drives for yarders and the like, and more particularly to a novel cable drive which provides variable tensioning of the main and haulback cables.

Cable drives with variable cable tensioning have been provided heretofore. However, they are characterized by complex and costly construction, they are susceptible of frequent malfunctioning and breakdown and require frequent maintenance and repair. They include slipping clutches which waste power, generate excessive heat and require frequent replacement of parts.

SUMMARY OF THE INVENTION

In its basic concept the cable drive of the present invention provides rotational control of the main haulback cable drums by connecting them together through a coupling member connected to a driven shaft through the relatively rotatable housing and output shaft of a hydraulic motor.

It is by virtue of the foregoing basic concept that the principal objective of the present invention is achieved, namely to overcome the disadvantages of prior cable drive systems, as enumerated hereinbefore.

Another important object of the present invention is the provision of a cable drive system of the class described including means by which the direction of rotation of the drums may be reversed without reversing the direction of rotation of the driven shaft, thereby accommodating the use of any conventional power source having a rotary output shaft which rotates in one direction only.

The foregoing and other objects and advantages of the present invention will appear from the following detailed description, taken in connection with the accompanying drawings of the preferred embodiments.

DESCRIPTION OF THE PREFERRED EMBODIMENTS

Figure 1:
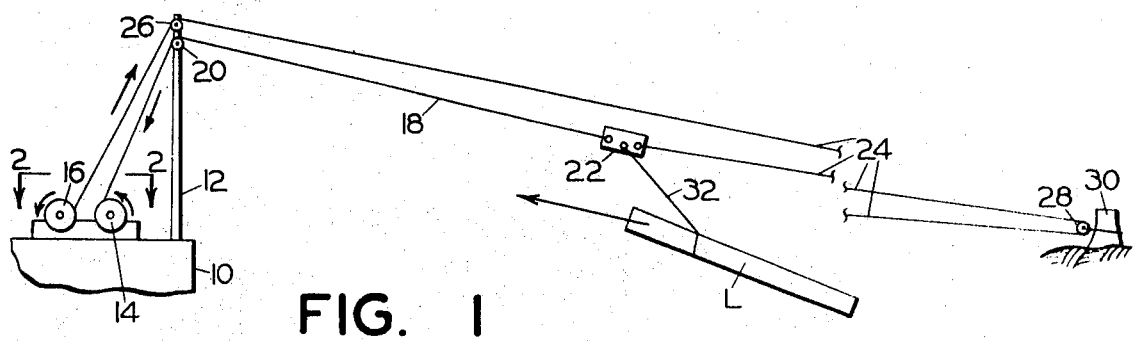
FIG. 1 is a foreshortened view in side elevation illustrating a typical log yarding system and incorporating therewith a cable drive system embodying the features of the present invention.

Referring to FIG. 1 of the drawings, there is shown for purposes of illustration the essential elements of a conventional log yarding system. This includes a yarder comprised of a base 10 supporting an upstanding elongated boom 12 and a pair of power-driven winch drums 14 and 16. The drum 14 mounts a mainline cable 18 which extends therefrom upward over a pulley 20 adjacent the top of the boom and thence outward for attachment at its free end to a connector member 22 such as a carriage or the simple butt rigging illustrated. The other drum 16 mounts a haulback cable 24 which extends therefrom upward over a pulley 26 adjacent the top of the boom and thence outward a substantial distance, around a tail block pulley 28 which is anchored by such means as the stump 30, and then rearward for connection at its free end to the butt rigging 22. A logging cable 32 extends downward from the butt rigging and is provided at its lower end with a choker, grapple, or other suitable device, as preferred, for conveying logs L.

It is to be understood that the foregoing system is merely illustrative of many types of driven cable systems in which a connector member is movable between spaced positions by appropriate movement of mainline and haulback cables. For example, such a system may be utilized for transporting objects, such as cargo or personnel, from one ship to another.

In cable drive systems of the types illustrated it is often desirable that the cables be maintained in tension in order to assure sufficient elevation of the cables above the ground or other underlying surface. In the log yarding system illustrated in FIG. 1, such elevation is required in order to maintain the leading end of the logs L elevated above the ground sufficiently to clear stumps and other obstacles during transport to the yarder landing.

Figure 2:
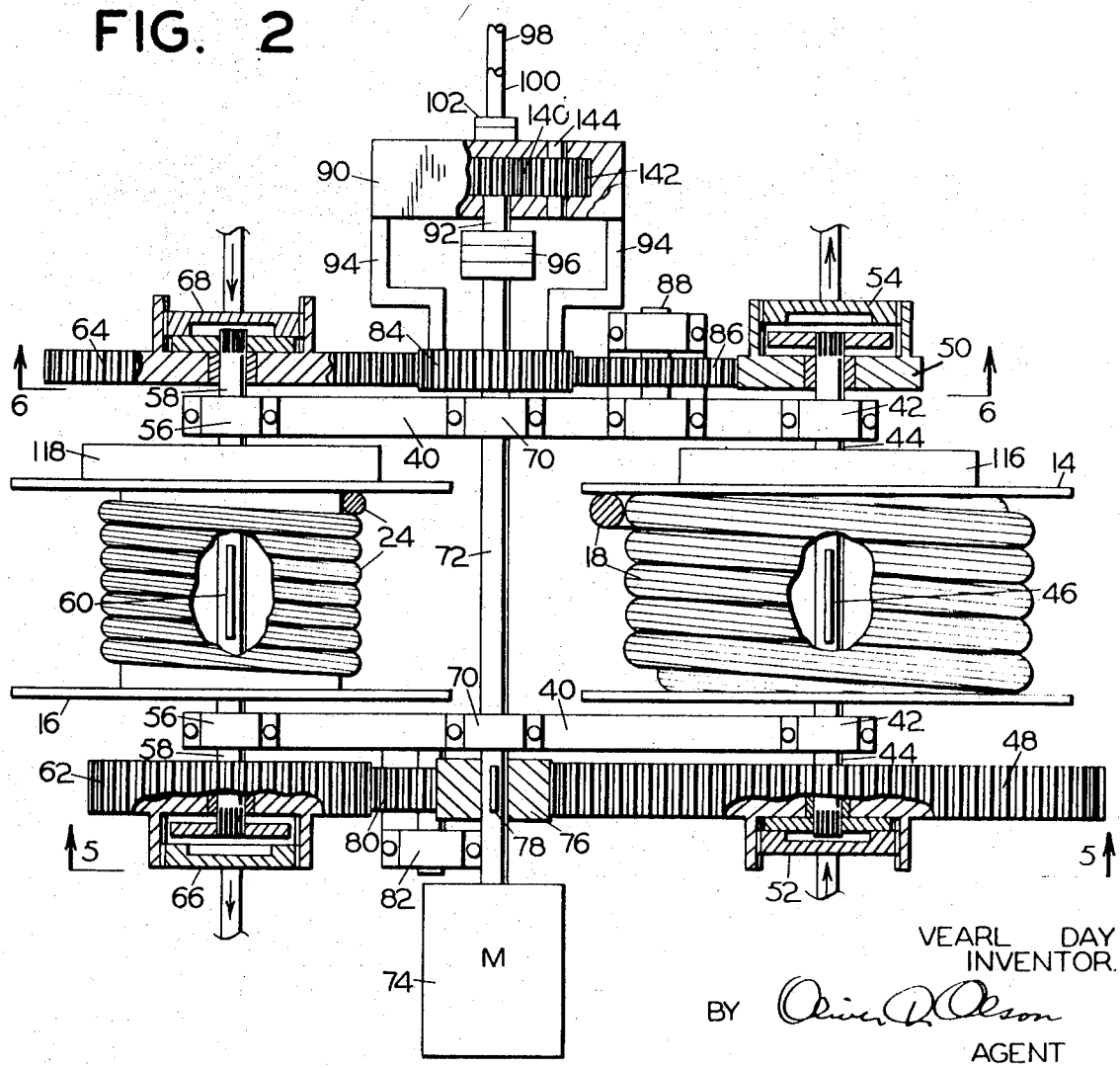
FIG. 2 is a fragmentary plan view of the cable drive system as viewed in the direction of the arrows 2—2 in FIG. 1, parts being broken away to disclose details of internal construction.

In accordance with the present invention there is provided a cable drive system which affords variable tensioning of the cables. Referring particularly to FIG. 2, the system includes a supporting frame comprised of the laterally spaced frame member 40. Adjacent one end of the frame members the bearings 42 journal the transverse mainline cable drum shaft 44 for rotation. The mainline cable drum 14 is mounted on this shaft between the spaced frame members and is secured to the shaft by such means as the key 46. The drum supports the mainline cable 18 as will be understood.

Mounted on the opposite ends of the shaft 44 for independent rotation relative to the shaft are the gears 48 and 50. These gears are connected releasably to the shaft selectively by independently operable clutches 52 and 54, respectively. There are many types of clutches available commercially that are suitable for this purpose, such as conventional magnetic clutches. Although friction type clutches may be employed, it is preferred to use clutches of the positive type.

At the opposite end of the frame members the bearings 56 journal the haulback cable drum shaft 58 for rotation. The shaft supports the haulback cable drum 16 between the frame members, the drum being secured to the shaft by such means as the key 60. The drum mounts the haulback cable 24.

The opposite ends of the shaft 58 support the gears 62 and 64 for rotation relative to the shaft, the gears being connected releasably to the shaft selectively by means of the clutches 66 and 68, respectively.

Intermediate the cable drums the bearings 70 on the frame members journal the transverse driven shaft 72 for rotation. One end of this shaft is connected to a source 74 of rotary power. This source of power may be of any conventional type such as an electric or hydraulic motor, a gasoline or diesel engine, or any other type desired.

Means is provided for coupling the driven shaft 72 to the main and haulback drum gears 48 and 62 for simultaneous rotation. In the embodiment illustrated this means comprises the coupling gear 76 secured to the driven shaft by such means as the key 78, and the idler gear 80 supported by the idler shaft 82 mounted on the frame.

Means also is provided for coupling the driven shaft to the main and haulback drum gears 50 and 64 for simultaneous rotation. This means is provided, in the embodiment illustrated, by the coupling gear 84 mounted for independent rotation relative to the driven shaft and the idler gear 86 mounted on the idler shaft 88 supported by the frame.

It is by virtue of the provision of the idler gears 80 and 86 in the manner illustrated that the source 74 of power for the driven shaft 72 need only be of the type having an output shaft rotatable in one direction only, as explained more fully hereinafter. This minimizes the cost of the power source and hence of the cable drive system.

Means is provided for connecting the driven shaft 72 and relatively rotatable coupling gear 84 together for varying the degree relative rotation between them. In the basic concept of this invention this connection is provided by the relatively rotatable housing 90 and output shaft 92 of a hydraulic motor. In the embodiment illustrated in FIG. 2 the motor housing is secured to the coupling gear 84 by means of the brackets 94 which are welded or otherwise secured to the housing and gear. The output shaft 92 of the motor is connected to the driven shaft through the coupling 96.

Figure 3:
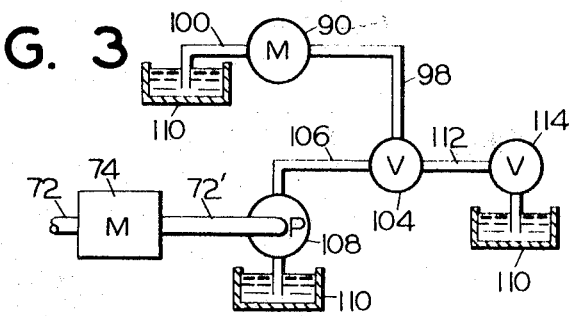
FIG. 3 is a schematic diagram of a fluid pressure system for operating the fluid pressure motor component of the cable drive system.

Hydraulic fluid under pressure for operating the motor is supplied by means of the hydraulic conduits 98, 100 and the rotating union 102. Although various types of fluid pressure sources are available commercially, the arrangement illustrated in FIG. 3 is preferred, for reasons explained in detail hereinafter. In the illustrated arrangement the input to the motor communicates through conduit 98, sequence valve 104 and conduit 106 to the output of a variable volume hydraulic pump 108, the input of which communicates with hydraulic fluid reservoir 110. Conduit 100 also communicates with the reservoir 110. Sequence valve 104 also communicates conduit 98 with conduit 112 connected to overrun limiter valve 114 which also communicates with reservoir 110.

The pump 108 is of conventional construction and is adjustable over a wide range to deliver a constant predetermined pressure of hydraulic fluid to the hydraulic motor. The sequence valve also is conventional construction and is adjustable to a predetermined pressure, preferably slightly higher than the pressure output of the pump 108. Thus, in the event the hydraulic motor should operate in such manner, as explained hereinafter, as to create a back pressure in conduit 98 which exceeds the setting of the sequence valve, the latter operates to interconnect the conduits 98 and 112 and thus relieve the excess pressure through the overrun limiter valve 114.

The pump 108 may be driven from any suitable source of power. In the preferred embodiment illustrated, it is driven by the source 74 of rotary power which is provided with a secondary output shaft 72'. This secondary output shaft conveniently may be merely an extension of the driven shaft 72.

The cable drums 14 ans 16 are provided with brake drums 116 and 118, respectively. Associated with these brake drums, but not shown in the drawings, are brake shoes or bands which may be operated manually or mechanically, for purposes explained in detail hereinafter.

Figure 4:
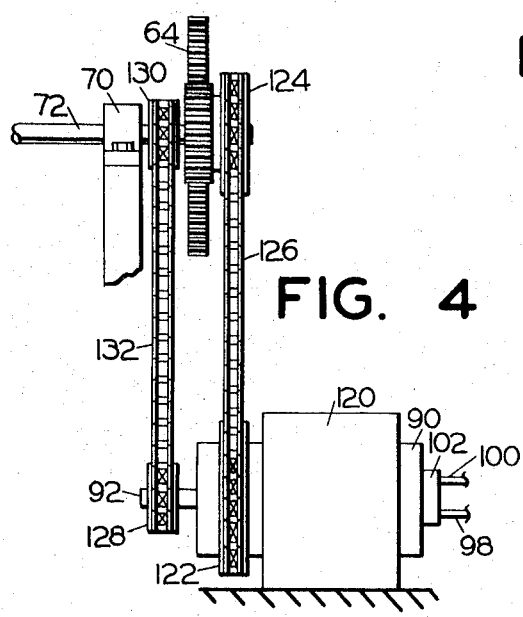
FIG. 4 is a fragmentary view in side elevation illustrating a modified form of connection between the hydraulic motor housing an output shaft and the cable drum coupling member and driven shaft.

FIG. 4 illustrates an alternative form of connection of the hydraulic motor to the driven shaft 72 and coupling gear 84. Thus, the hydraulic motor housing 90 is supported for rotation in a frame 120 remote from the driven shaft and coupling gear. A sprocket 122 on the motor housing is coupled to a sprocket 124 on the coupling gear by means of the chain 126. A sprocket 128 on the output shaft 92 of the hydraulic motor is coupled to a sprocket 130 on the driven shaft 72 by the chain 132.

The arrangement illustrated in FIG. 4 accommodates varying the rotational speeds of the interconnected elements, by varying the relative diameters of interconnected sprockets, as will be understood.

For the purpose of the following description of operation of the system, let it be assumed that the main cable drum gears 48 and 50 have 90 to 30 teeth respectively, the haulback drum gears 62 and 64 have 45 and 60 teeth respectively, the coupling gears 76 and 84 have 18 and 24 teeth, respectively, and the driven shaft 72 is rotated at a constant speed of 100 r.p.m. Let it also be assumed that the connector member 22 is extended from the yarder to its maximum limit, i.e., adjacent the stump 30 (FIG. 1), and in such position the haulback drum 16 is full of cable 24 to a diameter of 40 inches and the main drum 14 is empty at a diameter of 20 inches.

Figure 5:
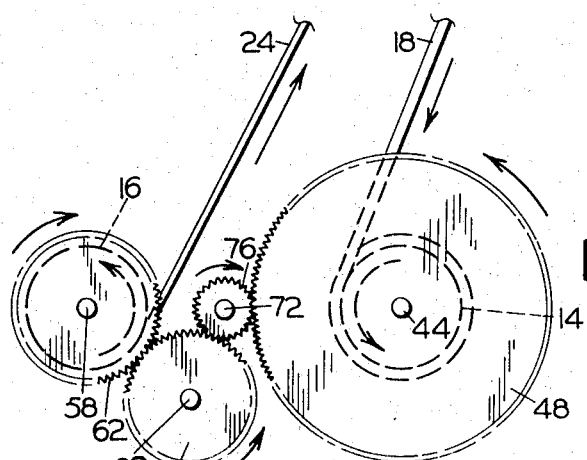

Assuming now that it is desired to haul the connector member 22, with its attached log L or other load, in to the yarder, the operator manipulates the controls (not shown) to cause engagement of the clutches 52 and 68 and disengagement of the clutches 54 and 66, as illustrated in FIG. 2. Rotary power from the driven shaft 72 thus is transmitted (FIG. 5) to the gear 76 and thence through the engaged clutch 52 and mainline drum shaft 44 to the mainline cable drum 14 to rotate the latter in the counterclockwise direction illustrated in FIG. 5 to wind in the mainline cable 18.

As the mainline cable is hauled in, the haulback cable 24 is pulled from the haulback drum 16. Because of the relative diameters of the mainline and haulback cable coils the haulback drum rotates at half the speed of the mainline cable drum, which is rotating at 20 r.p.m. because of the relative numbers of teeth in the gears 48 and 76. Accordingly, the haulback drum is rotating at 10 r.p.m., corresponding to the length demand of the mainline cable drum.

Figure 6:
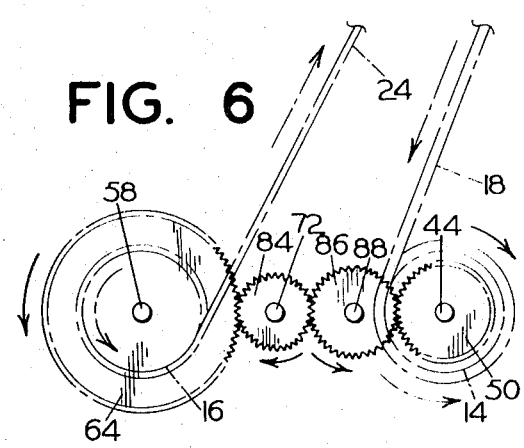
FIGS. 5 and 6 are fragmentary sectional views taken on the lines 5—5 and 6—6, respectively, in FIG. 2 and illustrating the rotational relationships between gears (solid arrows) and cable drums (broken line arrows) in the condition of coupling illustrated in FIG. 2.

Also, the haulback drum gear 64 (FIG. 6) is rotating counterclockwise at 10 r.p.m., transmitting power to the coupling gear 84 to drive the latter at 25 r.p.m., as determined by the relative numbers of teeth in said gears. The direction of rotation of the coupling gear 84, and hence of the attached motor housing 90 of the hydraulic motor, is the same as that of the driven shaft 72.

The opposing rotations of drum gears 50 and 62 have no effect since their associated clutches 54 and 66 are disengaged.

The driven shaft thus effects rotation of the hydraulic motor gear 140 at 100 r.p.m., by direct connection through the motor output shaft 92. Since the hydraulic motor housing 90 is rotating in the same direction at 25 r.p.m., the motor gear 142 mounted on the shaft 144 secured to the motor housing 90 is caused to translate about the axis of the output shaft 92 at the same speed of 25 r.p.m.

The relative rotation between the hydraulic motor gears thus is 75 r.p.m., whereupon the hydraulic motor is caused to function as a pump. However, it is pumping to atmospheric pressure and therefore offers minimum resistance to the gear train.

Assuming it is now desirable to increase the tension in the haulback cable 24 to achieve the desired elevation of the cable system above the ground, the operator adjusts the pump 108, and sequencing valve 104, to increase the hydraulic pressure in the conduit 98 to the motor. This effects a decrease in the translation speed of the gear 142, and hence the motor housing 90 and attached coupling gear 84, thereby decreasing the speed of rotation of the haulback cable drum 16. This reduction in the rate at which haulback cable 24 is paid out from the drum causes slack to be taken out of the cable system.

When the tension in the cable system increases to the extent that it exerts a torque equal to that being impressed by the hydraulic motor, the haulback cable drum 16 resumes a speed which will meet the cable demand of the mainline drum 14. The acquired cable tension will be maintained, however, since the hydraulic motor continues to maintain pressure by action of the variable volume pump 108.

As pressure is developed in the hydraulic motor the torque developed by the motor housing 90 to increase cable tension is opposed, both in magnitude and direction, by the torque on the motor gear 140 which is transmitted directly to the driven shaft 72 in the same direction or rotation thereof. Accordingly, after the cable tensioning is completed and the haulback cable drum is again supplying the length demand of the mainline cable drum, the hydraulic pump provides work sufficient only to overcome friction, inertia, etc., in the system.

In the present illustration wherein the system is adjusted to haul in r.p.m., mainline cable 18, and wherein initially the gear 140 of the hydraulic motor is rotating counterclockwise at 100 r.p.m. and the motor housing 90 is rotating counterclockwise at 25 r.p.m. to provide a gear meshing speed of 75 r.p.m., it will be apparent that a change in volume flow through the motor can only be accomplished by changing the rotational speed of the meshing gears. Since the rotational speed of gear 140 is fixed by the constant speed of the attached driven shaft 72, a change in gear meshing speed can only be accomplished by changing the rotational speed of the motor housing 90. Assuming, for example, that the motor housing is caused to change rotational direction to clockwise at 50 r.p.m., the meshing speed of the gears 140 and 142 is increased to 150 r.p.m. Accordingly, the motor requires twice as much hydraulic fluid as it did when the gear meshing speed was 75 r.p.m. This increase in volume requirement is supplied by the variable volume pump 108, and results in changing the direction of rotation of the haulback cable drum 16 to effect winding in of the haulback cable 24.

The hydraulic pressure and volume requirements of the hydraulic motor will vary throughout the operation of hauling in the mainline cable 18, as well as throughout the operation of hauling back the haulback cable 24, because the coil diameters of the drums vary as the cables are wound in or paid out. As the cable diameter decreases on the drum from which cable is being paid out, the torque exerted by an established cable tension will decrease in direct proportion to the decrease in coil diameter. Accordingly, the torque requirement from the hydraulic motor decreases in order to maintain the same tension in the cable. Conversely, as the coil diameter increases, the torque requirement of the hydraulic motor also increases. Since the coil diameter changes relatively slowly, the change of torque value also is relatively slow. However, the hydraulic motor will maintain a constant torque as prescribed by the pressure setting of the variable volume hydraulic pump 108.

It is this characteristic of substantially constant motor torque, regardless of rotational speed, that operates to maintain substantially constant cable tension throughout the operations of hauling in the mainline cable and hauling back the haulback cable.

When the connector member 22 has reached the opposite end of its travel, i.e., adjacent the yarder, let it be assumed that the coil of mainline cable 18 on the mainline drum will have increased to 40 inches and the diameter of the haulback cable 24 on the haulback drum 16 will have decreased to 20 inches. The mainline cable drum still is rotating at 20 r.p.m., but the haulback cable drum now must rotate at twice the speed of the mainline cable drum to meet the length demand of the latter. Consequently, since the haulback drum gear 64 also is rotating at 40 r.p.m., the coupling gear 84 and the attached hydraulic motor housing 90 now are rotating at 100 r.p.m. With the motor gear 142 translating at the same speed of 100 r.p.m. and the relative rotation between the motor gears being reduced to zero, (the volume demand of hydraulic fluid under pressure will also be zero. The fluid pressure requirement will be maintained even though the flow rate is reduced to zero.

Figure 7:
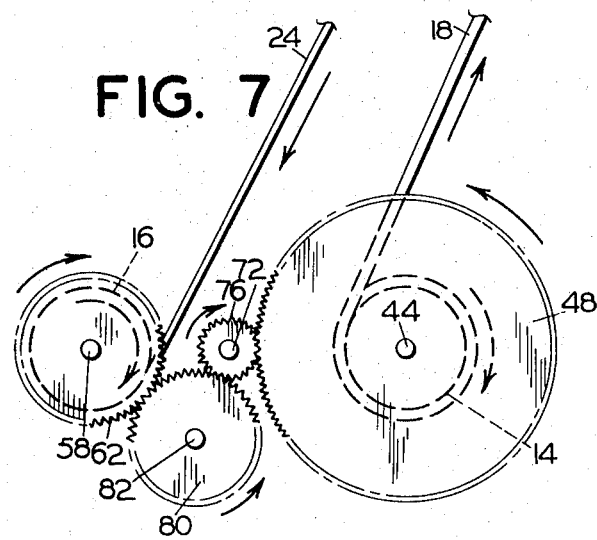
FIGS. 7 and 8 are fragmentary sectional views similar to FIGS. 5 and 6, respectively, illustrating the rotational relationships between gears and cable drums in an alternate condition of coupling from that illustrated in FIG. 2.
Figure 8:
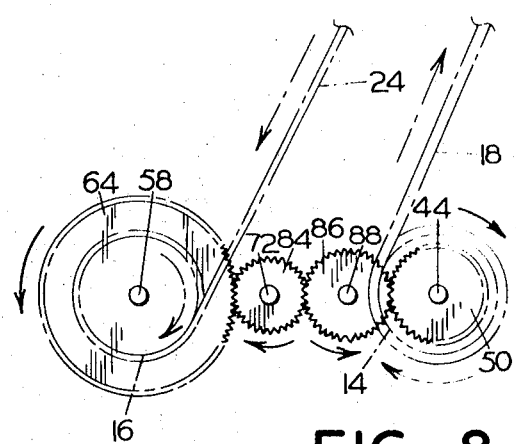

Let it now be assumed that it is desired to haul back the connector member 22 to the extended position adjacent the stump 30. The operator manipulates the controls to disengage the clutches 52, 68 and to engage the clutches 54, 66. With the driven shaft 72 still rotating at 100 r.p.m. in the same clockwise direction as previously described, power is transmitted through the coupling gear 76 and idler gear 80 to haulback drum gear 62 which now is connected to the haulback drum through the engaged clutch 66. Since the coupling gear 76 has 18 teeth and the haulback drum gear 62 has 45 teeth, the haulback drum rotates at 40 r.p.m. in the clockwise direction (FIG. 7) which will wind in the haulback cable 24.

The rotational speed of the mainline cable drum 14 must be 20 r.p.m. to supply the length demand of the haulback cable drum 16. Accordingly, since the mainline cable drum gear 50 has 30 teeth rotating at 20 r.p.m. and coupling gear 84 has 24 teeth, the hydraulic motor housing 90 is caused to rotate at 25 r.p.m. in the same direction as the driven shaft 72. Relative rotation of the motor gears 140 and 142 thus will be 75 r.p.m., and this may be adjusted as previously described in order to effect tensioning of the cable system.

When it is desired to pay out both mainline and haulback cables at the same time, the operator manipulates the controls to disengage the clutches 52, 66 and engage the clutches 54, 68 and also to close both hydraulic lines 98, 100 to the motor. Since the motor thus locks the driven shaft effects rotation of the drum gears 50, 64 and connected cable drums to cause both cables to pay out.

Conversely, when it is desired to wind in both cables at the same time, the operator manipulates the controls to effect disengagement of the clutches 54, 68 and engagement of the clutches 52, 66. The cable drum gears 48, 62 and the connected cable drums thus are rotated simultaneously through the coupling gear 76 and idler gear 80 to effect winding in of both cables.

When it is desired to secure the haulback cable 24 against movement and to pay out the mainline cable 18, clutches 52, 66 and 68 are disengaged, the brake is applied to the haulback brake drum 118, the hydraulic motor is locked by closing both conduits 98 and 100, and clutch 54 is engaged. Accordingly, since the driven shaft 72 is locked to the coupling gear 84 through the locked hydraulic motor, power is transmitted through the idler gear 86, drum gear 50 and engaged clutch 54 to the mainline cable drum 14, to effect rotation of the latter in the direction to pay out the mainline cable 18.

When it is desired to secure the haulback cable against movement and to wind in the mainline cable, clutches 54, 66 and 68 are disengaged, the brake is applied to the haulback brake drum 118 and clutch 52 is engaged. Power thus is transmitted through the coupling gear 76 to mainline drum gear 48 and the engaged clutch 52 to rotate the mainline cable drum 14 in the direction to wind in the mainline cable 18.

When it is desired to secure the mainline cable 18 against movement and to pay out the haulback cable 24, clutches 52, 54 and 66 are disengaged, the brake is applied to the mainline brake drum 116, the hydraulic motor is locked by closing the conduits 98 and 100, and clutch 68 is engaged. Since the driven shaft 72 is locked to the coupling gear 84 through the locked hydraulic motor, power is transmitted through said coupling gear, haulback drum gear 64 and engaged clutch 68 to rotate the haulback cable drum 16 in the direction to pay out the haulback cable 24.

When it is desired to secure the mainline cable against movement and to wind in the haulback cable, clutches 52, 54 and 68 are disengaged, the brake is applied to the mainline brake drum 116 and clutch 66 is engaged. Power now is transmitted through the coupling gear 76, idler gear 80, haulback drum gear 62 and engaged clutch 66 to rotate the haulback cable drum 16 in the direction to wind in the haulback cable 24.

If it is desired to utilize the hydraulic motor as a pump, for some auxiliary purpose by reconnecting the conduits 98 and 100 to such auxiliary device, all of the clutches are disengaged and the brakes applied to both brake drums 116 and 118 to secure the coupling gear 84 and connected motor housing 90 against rotation. Operation of the primary power source 74 thus effects rotation of the output shaft 92, whereupon the hydraulic motor functions as a pump.

As another illustration of the utility of the cable drive system of the present invention, let it be assumed that the yarder assembly at the left in FIG. 1 is mounted on one ship and that the pulley 28 is mounted on a second ship, spaced laterally from the first ship, and that the connector member 22 includes means for carrying personnel or cargo. The cable drive system as previously described functions effectively to maintain a predetermined tension in the cables automatically regardless of the rolling action of the two ships. The provision of the sequencing valve 104 and overrun limiter valve 114 in the hydraulic system illustrated in FIG. 3 assures proper operation of the cable drive system even under extreme conditions of relative movement between the ships, as follows:

Let it be assumed that some force acts on the haulback cable 24 to cause it to be pulled off of the haulback cable drum 16 faster than would normally be demanded by the mainline cable drum 14. Thus, the hydraulic motor housing 90 is caused to increase in counterclockwise rotation. As previously explained, if the housing speed is increased from the previously exemplified 25 r.p.m., to 100 r.p.m., the meshing speed of the gears will be zero. As the housing speed is increased, the volume demand on the pump 108 decreases until the gear meshing speed reduced to zero. The volume delivery of the pump thus would be zero, and the pressure would remain constant.

Now, if the action of the haulback cable 24 causes a further increase in the counterclockwise rotational speed of the motor housing 90, the direction of rotation of the meshing gears will be reversed and the motor will function as a pump to increase the pressure of hydraulic fluid in the conduit 98. When this pressure exceeds the pressure setting of the sequencing valve 104, the latter operates to interconnect conduits 98 and 112, to relieve the excess pressure through the overrun limiter valve 114.

From the foregoing it will be appreciated that the present invention provides simplified and economical means by which to vary the tension of a closed looped cable system during movement of the latter in either direction. Maximum efficiency of operation is achieved by minimization of power losses due to friction, heat and other factors. Reversible operation of the cable drums is achieved with less expensive conventional power sources providing only a unidirectional output. The system is compact and thus adaptable for association with conventional yarding equipment with speed and facility.

It will be apparent to those skilled in the art that various changes may be made in the size, shape, number and arrangement of parts described hereinbefore. For example, an additional idler gear may be associated with either or both of the gears 80, 86 if it is desired to reverse the winding of the cables on the associated drums. The hydraulic gear motor may be replaced by a hydraulic motor of the piston or vane type, or by an air or other fluid pressure type motor. The interengaging drum, coupling and idler gears may be replaced by a system of sprockets and chains, and therefore the latter are to be understood as being included in the term "gear means" as employed in the appended claims. These and other changes may be made without departing from the spirit of this invention.

Having now described my invention and the manner in which it may be used, I claim:

1. A cable drive system comprising
   a. a frame,
   b. a mainline cable drum shaft journaled for rotation on the frame and mounting a mainline cable drum for rotation therewith,
   c. first and second mainline drum gear means mounted on the mainline drum shaft for independent rotation,
   d. first and second mainline drum clutch means releasably connecting the mainline drum shaft selectively to the first and second mainline drum gear means, respectively,
   e. a haulback cable drum shaft journaled for rotation on the frame and mounting a haulback cable drum for rotation therewith,
   f. first and second haulback drum gear means mounted on the haulback drum shaft for independent rotation,
   g. first and second haulback drum clutch means releasably connecting the haulback drum shaft selectively to the first and second haulback drum gear means, respectively,
   h. a rotary driven shaft mounted on the frame,
   i. power means engaging the driven shaft for rotating the latter,
   j. first coupling gear means engaging the first mainline and haulback drum means and connected to the driven shaft for simultaneous rotation therewith,
   k. second coupling gear means engaging the second mainline and haulback drum gear means,
   l. a fluid pressure connector motor having a housing and a rotary output shaft,
   m. means connecting the motor housing and output shaft one to the driven shaft and the other to the second coupling gear means, and
   n. a variable volume fluid pressure pump connected to the fluid pressure connector motor for supplying substantially constant fluid pressure to the latter.